United States Patent [19]
Yoshigai

[11] 3,800,618
[45] Apr. 2, 1974

[54] BRAKE OPERATING DEVICE FOR BICYCLE

[76] Inventor: Kiyokazu Yoshigai, 9-15 Wakaeminami-machi 1-chome, Higashiosaka-shi, Osaka-fu, Japan

[22] Filed: Jan. 22, 1973

[21] Appl. No.: 325,719

[52] U.S. Cl.................. 74/489, 74/541, 188/265
[51] Int. Cl........ B62k 23/06, B621 3/02, G05g 5/06
[58] Field of Search....... 74/488, 489, 541; 188/265

[56] References Cited
UNITED STATES PATENTS
| | | | |
|---|---|---|---|
| 2,716,031 | 8/1955 | Roessler | 74/541 X |
| 2,472,442 | 6/1949 | Schueler | 74/541 X |
| 2,492,466 | 12/1949 | Day | 74/541 |
| 2,560,154 | 7/1951 | Brown | 74/541 X |

*Primary Examiner*—Allan D. Herrmann
*Attorney, Agent, or Firm*—Sughrue, Rothwell, Mion, Zinn & Macpeak

[57] ABSTRACT

Bicycle hand brake means in which a brake lever is pivoted to a bracket secured to a bicycle handle; an elongated slot is formed through the front wall of the bracket; and a locking lever having its one end pivoted to the brake lever and a toothed engaging portion is extended through the slot so that the locking lever may be selectively engaged with the bracket, thereby maintaining the brake application.

2 Claims, 4 Drawing Figures

PATENTED APR 2 1974  3,800,618
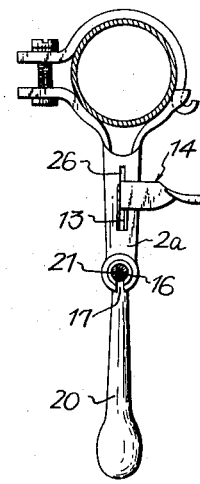
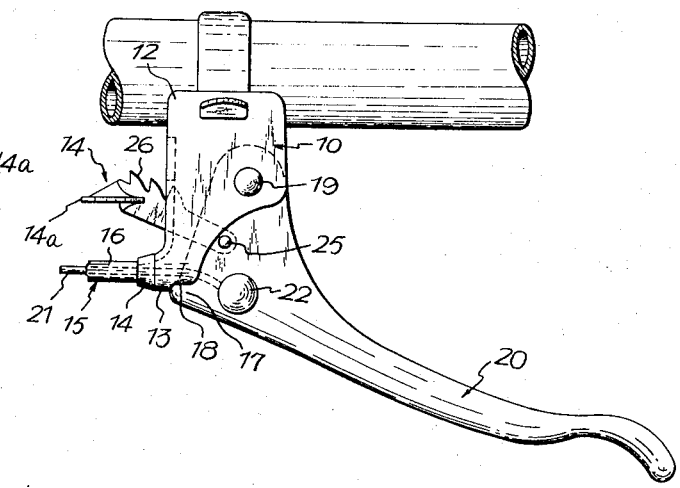
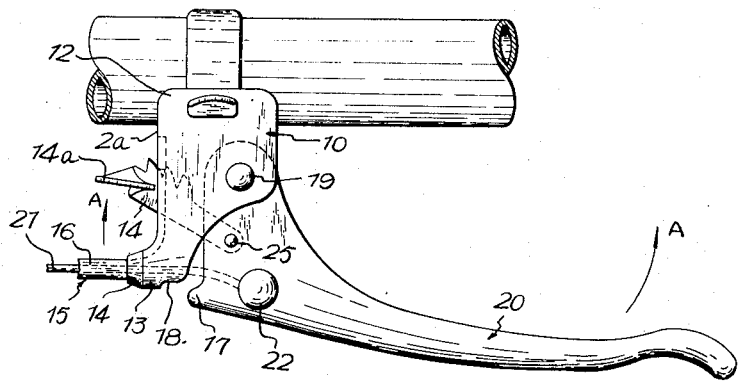
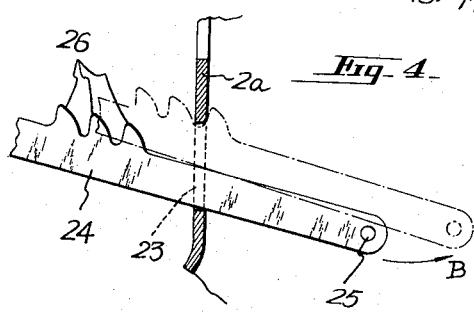

BRAKE OPERATING DEVICE FOR BICYCLE

BACKGROUND OF THE INVENTION

The present invention relates to a brake operating device fitted to the bicycle handle and more particularly a brake operating device having simple locking or detent means for maintaining a brake lever selectively in its brake application position so that the device can eliminate the necessity of gripping the brake lever all the time while running down a long downward slope so as to apply the brake because when the locking or detent means is actuated to its locking position the brake securely remains applied even after the hand is released from the brake lever, whereby the steering of the bicycle is much facilitated and the fatigue due to the continuous gripping both of the handle and the brake lever for operating the brake may be substantially reduced.

In general, as is widely known, the brakes of the front and rear wheels of the bicycle are actuated by the brake levers attached to the handle through the brackets and connected to the flexible release wires which are resiliently biased by the springs or the like. Therefore the rider must grip both the handle for steering and the brake levers for pulling the release wires so as to actuate the brake shoes or the like depending upon the running conditions. Especially when running down a long downward slope, it is imperative for the rider to grip simultaneously both of the handle and the brake levers securely all the time. In this case, a strong brake actuating force is required since the release wires which are normally biased to the brake release positions by the springs or the like must be pulled against the springs for applying the brake. That is, the brake actuating force must overcome the returning force of the springs. Therefore, gripping the brake levers for pulling the release wires for a considerably longer time gives much fatigue to the rider. Furthermore, it is imperative to steer the handle all the time depending upon running conditions such as a flat plate or slope, vehicles, pedestrians and so on so that the rider often tends to release the brake levers, thereby causing a momentary interruption of brake application. Gripping simultaneously both of the handle and the brake levers for a long time will inevitably gives much fatigue and mental stress to the rider, so that the rider finds it very difficult to quickly steer the handle in response to the ever-changing running conditions. The brake lever of the character described above having the serious problems described has not been improved and is inconvenient in operation.

SUMMARY OF THE INVENTION

In view of the above, the primary object of the present invention is to provide an improved bicycle brake operating device of the type in which a brake lever once actuated to its brake operating or applying position may securely remain in this position even after a rider release his grip from the brake lever as long as he desires.

Another object of the present invention is to provide an improved bicycle brake operating device in which a brake lever may be selectively locked in its brake operating or applying position depending upon the running speed of the bicycle and upon the extent of brake application that a rider desires.

Further object of the present invention is to provide an improved bicycle brake operating device in which the brake remains applied as long as a rider desires without gripping the brake lever and the brake may be released or further applied for quick stop only by gripping the brake lever again.

Further object of the present invention is to provide an improved bicycle brake operating device which can eliminate the fatigue and stress of a rider due to frequent operations of a brake lever while steering the handle of the bicycle so that the smooth steering may be ensured, thereby providing the safe-guarded running and facilitating the steering of the bicycle.

Further of the present invention is to provide an improved bicycle brake operating device which is simple in construction and reliable in operation and is free from breakdown, thereby safeguarding the running.

The above and other objects, features and advantages of the present invention will become more apparent from the description of an illustrative embodiment thereof with reference to the accompanying drawings.

BRIEF DESCRIPTION OF THE DRAWINGS

FIG. 1 is a front view of one embodiment of the present invention.

FIG. 2 is a side view thereof viewed from the left in FIG. 1.

FIG. 3 is a view similar to FIG. 1 illustrating the brake lever locking position, and FIG. 4 is a view illustrating a locking lever according to the present invention.

DESCRIPTION OF THE PREFERRED EMBODIMENT

At the leading side edge of a wall 12 of a lever housing or bracket 10 is formed a projection or guide sleeve 13 to which is secured an outer wire 16 of a release wire 15 which is interconnected with a brake member for applying or releasing the brake of a wheel of a bicycle (not shown) through detent or locking means generally indicated by 14. A brake lever 20 is pivotably secured by a pivot 19 to the lever housing or bracket between the lower side walls thereof in such a manner that the leading end portion 17 of the brake lever 20 may abut against a notched portion 18 formed at the rear end of the projection or guide sleeve 13. One end of an inner wire 21 is securely fixed by a pin 22 to suitable position of the brake lever 20. A locking slot 23 is formed vertically through a front wall 2a on the side of the release wire 15 of the wall 12 and a locking lever 24 is pivotably secured by pin 25 to the brake lever 20 substantially intermediate between the pivot 19 and the pin 22. The locking lever 24 has a bent configuration and its free end 14a is bent toward the pin 25 so as to form an L-shaped operating member. A saw-tooth shaped engaging member 16 is formed along the top of the lever 24.

Next the mode of operation of a brake operating device according to the present invention will be described hereinafter. When it is desired to continuously apply the brake and to reduce the speed of the bicycle at the downward slope the rider grips and rotates the brake lever 20 in the direction indicated by the arrow A so that the inner wire 21 is pulled toward the lever housing or bracket 10. After suitably adjusting the speed of the bicycle to safely ride down the downward slope, the rider pushes the operating member 14a of the locking lever 24 in the direction indicated by the arrow B by his index finger while gripping the brake lever 20 so that the engaging member 26 may engage with the upper side of the locking slot 23. Thereafter, the rider stops pushing the operating member 14a and releases the brake lever 20. (In this state, the locking lever 24 is shown by the chain line in FIG. 4). Thus, it will be seen that the returning rotation (in the direction opposite to that indicated by the arrow A) of the brake lever 20 by the force of a spring or the like of the inner wire 21 will be positively prevented by the engagement of the engaging member 26 of the locking lever 24 pivoted to the lever 21 with the upper side of edge of the locking slot 23. Therefore, the brake lever 20 remains in brake applying position so that the rider may safely run down the downward slope at a suitably braked speed without gripping the brake lever 20.

When it is desired to release the above described brake application, the rider grips and rotates the brake lever 20 slightly in the direction indicated by the arrow A so that the engagement of the engaging member 26 with the locking slot 23 may be immediately released because the locking lever 24 moves downwardly naturally by its own weight. Thereafter, when the rider releases the brake lever 20, the lever will return to its normal position as shown in FIG. 1 (the position indicated by the solid line in FIG. 4).

From the foregoing, it will be seen that when it is desired to apply brake and to continue running with the brake applied for a certain time depending upon the running conditions, it is not necessary at all according to the present invention to grip securely the brake lever with the same hand that is gripping the handle so that the brake operating device of the present invention is very effective in relieving the rider from fatigue and mental stress.

One of the most important advantages accrued from the present invention is a simple mechanism because the locking lever pivoted to one side of the brake lever the locking slot 23 is formed at a portion of the housing or bracket 10, and the engaging member 26 is formed in the locking lever. That is, when the brake lever tends to rotate about the pivot 19 by the resilient returning force of the inner wire 21, the engaging member 26 of the locking lever 24 may engage with the locking slot 23 by the force which tends to rotate the lever 24 in the same direction with that of the brake lever 20, whereby the locking action is positive and strong by the interrelation of action and reaction. Therefore, the brake operating device of the present invention can completely eliminate the fatigue caused by gripping the brake lever for a long time with the considerably strong force when running down a long downward slope. Furthermore the brake locking operation may be securely effected by the locking lever 24 which may be actuated only by one finger of the hand gripping the handle grip so that such operation may be effected by any rider. When the brake must be applied to full extent for complete and quick stop during the running with the brake applied partially as described hereinabove, it is only required for the rider to grip the brake lever 20 with stronger force without operating the locking lever 24 so that no accident and danger will occur. When it is desired to release the brake, the engagement of the engaging member 26 with the locking slot 23 may be automatically released only by gripping the brake lever 20 so that the brake lever 20 as well as the wire 21 may return automatically to their initial or brake releasing position. To sum up, the bicycle running with the brake being partially applied can be remarkably improved without causing any fatigue and mental stress to the rider.

It is to be understood that variations and modifications in designs also belong to the scope of the present invention.

What I claim is:

1. A brake operating device for bicycle comprising
   a. brake lever means connected directly to a release wire for actuating brake means,
   b. housing means adapted to be secured to a handle of a bicycle in which is pivotably secured said brake lever means and which has a locking slot formed through a front wall portion thereof, and
   c. locking lever means having one end thereof pivoted to said brake lever means and an engaging member for interlocking engagement with said slot formed at the upper side surface thereof and extending through said locking slot wherein the free end of said locking lever remote from its pivotal point to said brake lever means is bent in one direction so as to provide a member which may be easily operable by one finger of an operator's hand gripping the handle of the bicycle.

2. A brake operating device as set forth in claim 1 wherein said engaging member comprises a plurality of teeth so that said brake lever means may be locked at an arbitrary brake applying position.

* * * * *